(12) United States Patent
Li et al.

(10) Patent No.: US 10,110,082 B2
(45) Date of Patent: Oct. 23, 2018

(54) PERMANENT MANGET SYNCHRONOUS MOTOR AND METHOD ASSEMBLING SAME

(71) Applicants: linZhen Li, Shenzhen (CN); ZhuMing Chu, Shenzhen (CN)

(72) Inventors: linZhen Li, Shenzhen (CN); ZhuMing Chu, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 175 days.

(21) Appl. No.: 15/417,212

(22) Filed: Jan. 26, 2017

(65) Prior Publication Data

US 2018/0115209 A1 Apr. 26, 2018

(30) Foreign Application Priority Data

Oct. 24, 2016 (CN) .......................... 2016 1 0938998

(51) Int. Cl.
| | |
|---|---|
| H02K 3/04 | (2006.01) |
| H02K 3/28 | (2006.01) |
| H02K 15/04 | (2006.01) |
| H02K 15/06 | (2006.01) |
| H02K 21/14 | (2006.01) |
| H02K 3/47 | (2006.01) |

(52) U.S. Cl.
CPC ................ *H02K 3/28* (2013.01); *H02K 3/04* (2013.01); *H02K 3/47* (2013.01); *H02K 15/045* (2013.01); *H02K 15/061* (2013.01); *H02K 21/14* (2013.01)

(58) Field of Classification Search
CPC .. H02K 3/28; H02K 3/04; H02K 3/47; H02K 15/045; H02K 15/061; H02K 21/14
USPC ......... 310/201, 208, 179–180, 184–185, 200
See application file for complete search history.

(56) References Cited

U.S. PATENT DOCUMENTS

| | | | | |
|---|---|---|---|---|
| 4,346,320 A | * | 8/1982 | Davey | H02K 3/28 310/179 |
| 2004/0021391 A1 | * | 2/2004 | Jones | H02K 3/04 310/208 |
| 2007/0176509 A1 | * | 8/2007 | Kalsi | H02K 3/04 310/208 |
| 2016/0013694 A1 | * | 1/2016 | Dempster | H02K 3/04 310/208 |
| 2017/0222508 A1 | * | 8/2017 | Hashimoto | H02K 3/04 |

* cited by examiner

*Primary Examiner* — Thanh Lam
(74) *Attorney, Agent, or Firm* — Na Xu; IPro, PLLC

(57) ABSTRACT

A permanent magnet synchronous motor is provided in the present disclosure. The permanent magnet synchronous motor includes a rotor and a stator, wherein the rotor comprises a rotating shaft and a cylindrical magnet surrounding the rotating shaft, the stator comprises a base, a cylindrical core received in the base and surrounding the magnet and coil windings assembled with the core, the coil windings are symmetrical about the center axis of the core, the coil winding comprises a plurality of coils inserted into the core, each coil comprises a body part and extended parts respectively extended from two ends of the body part, a plurality of body parts are superposed and disposed in the core, a plurality of extended parts are respectively extended in the radial direction of the core and fixed on two end faces of the core, and the plurality of extended parts are partially superposed and distributed in a step shape.

9 Claims, 6 Drawing Sheets

PERMANENT MANGET SYNCHRONOUS MOTOR AND METHOD ASSEMBLING SAME

FIELD OF THE DISCLOSURE

The present disclosure generally relates to permanent magnet synchronous motor and assembly method thereof.

BACKGROUND

Permanent magnet synchronous motors have been widely applied in the fields of motors, generators and the like due to compact structure, high power density, high working efficiency and significant energy conservation and consumption reduction effects. The permanent magnet synchronous motor generally includes a rotor and a stator, a stator core of the permanent magnet synchronous motor in relevant technologies is provided with a tooth socket for positioning coil windings, but the tooth socket of the core is unlikely to machine, the output torque fluctuates, and high-precision speed and position control is difficult to realize; meanwhile, a rotor magnet of the permanent magnet synchronous motor is of a separated structure distributed in the rotor core, the magnet easily drops during working, and the machining and assembly process of the rotor magnet is tedious, so that automatic production is difficult to realize.

Therefore, it is desired to provide a permanent magnet synchronous motor and assembly method thereof to overcome the aforesaid problems.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and embodiments thereof.

Figure 1:
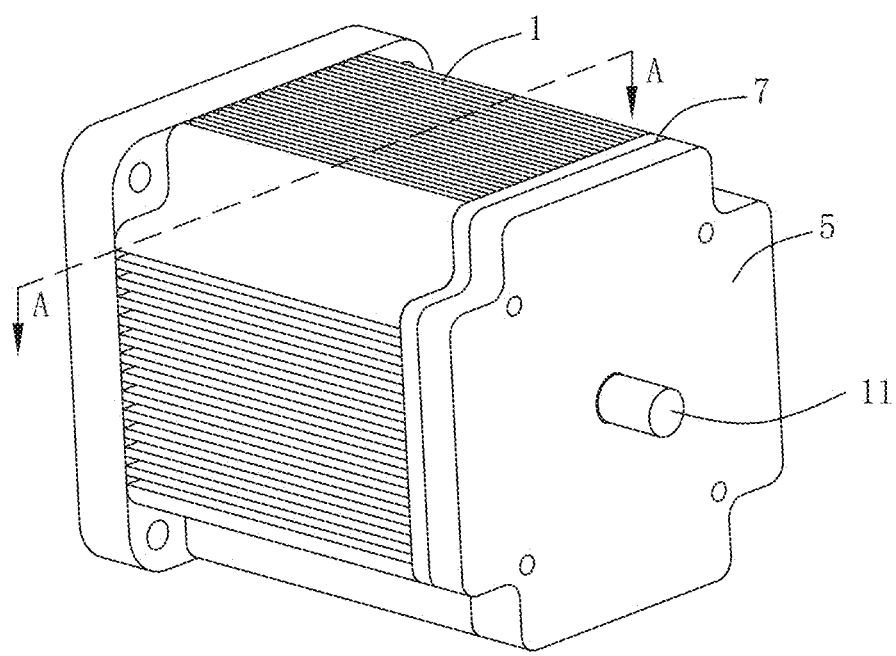
FIG. 1 is a three-dimensional structural diagram of a permanent magnet synchronous motor of the present disclosure.
Figure 2:
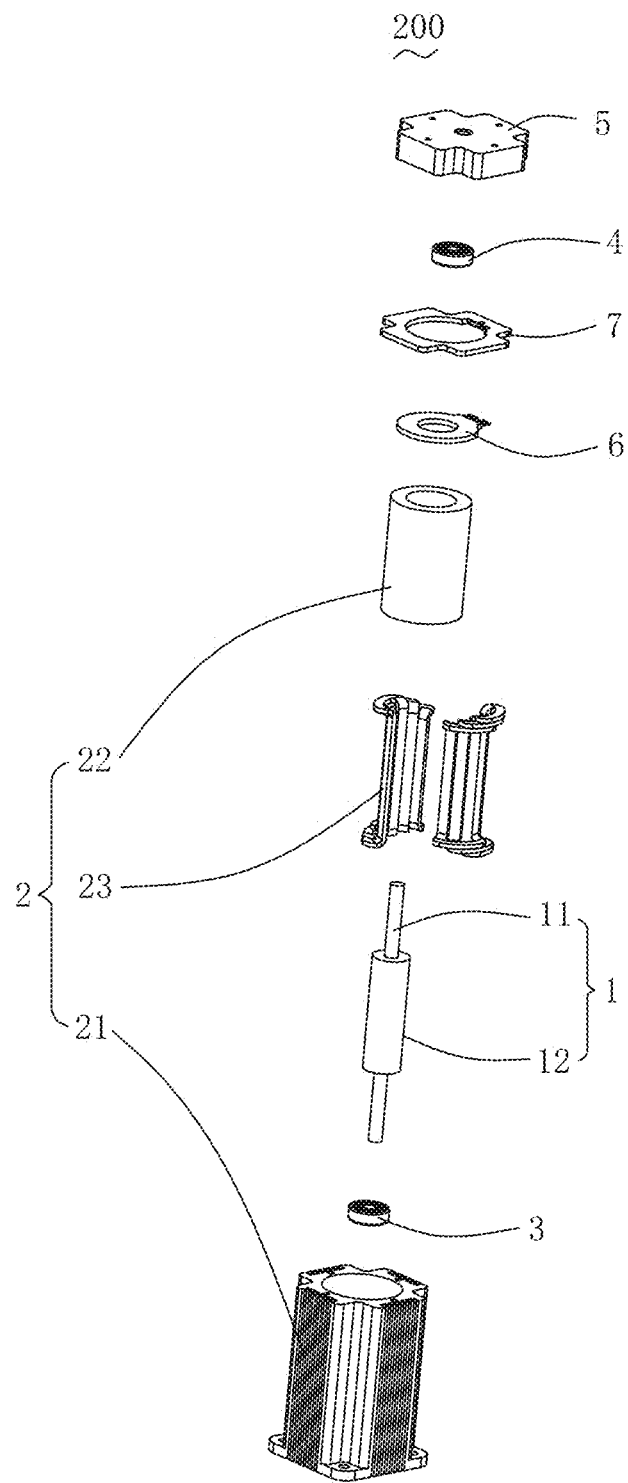
FIG. 2 is an exploded view of the permanent magnet synchronous motor shown in FIG. 1.
Figure 3:
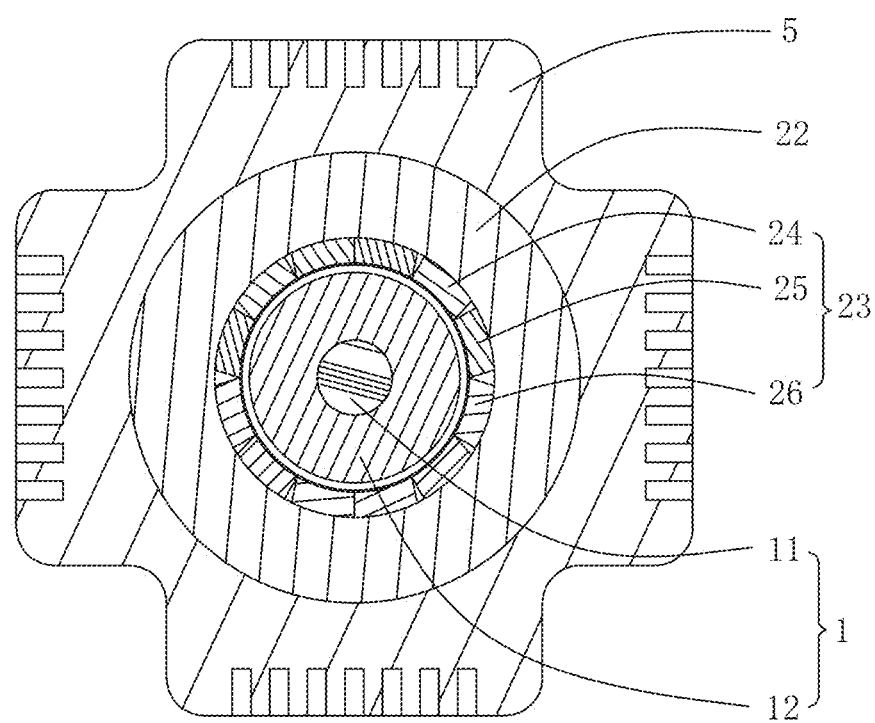
FIG. 3 is a cross-sectional view along an A-A line in FIG. 1.
Figure 4:
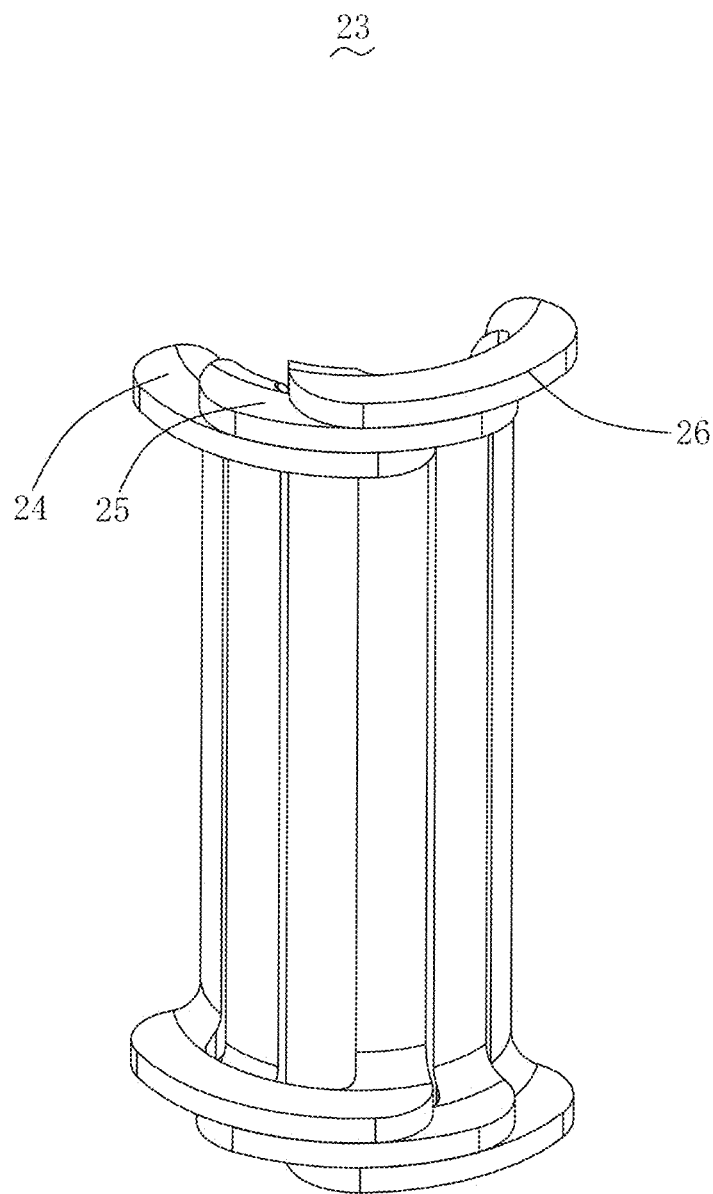
FIG. 4 is a three-dimensional structural diagram of coil windings of the permanent magnet synchronous motor shown in FIG. 1.
Figure 5:
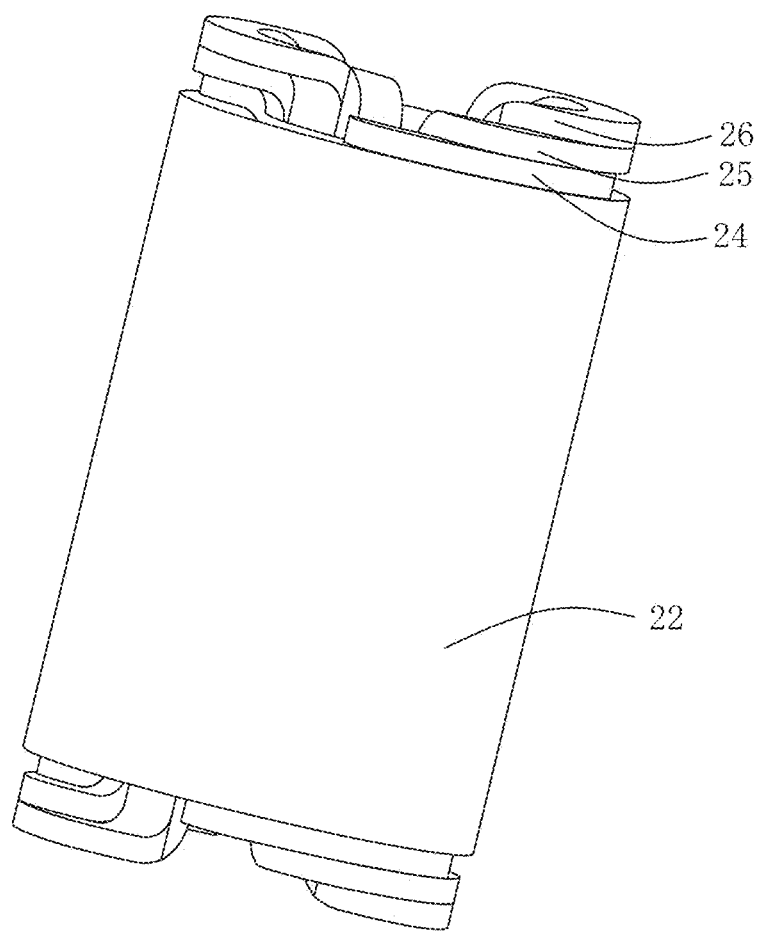
FIG. 5 is an assembly diagram of the coil windings and the core of the permanent magnet synchronous motor shown in FIG. 1.
Figure 6:
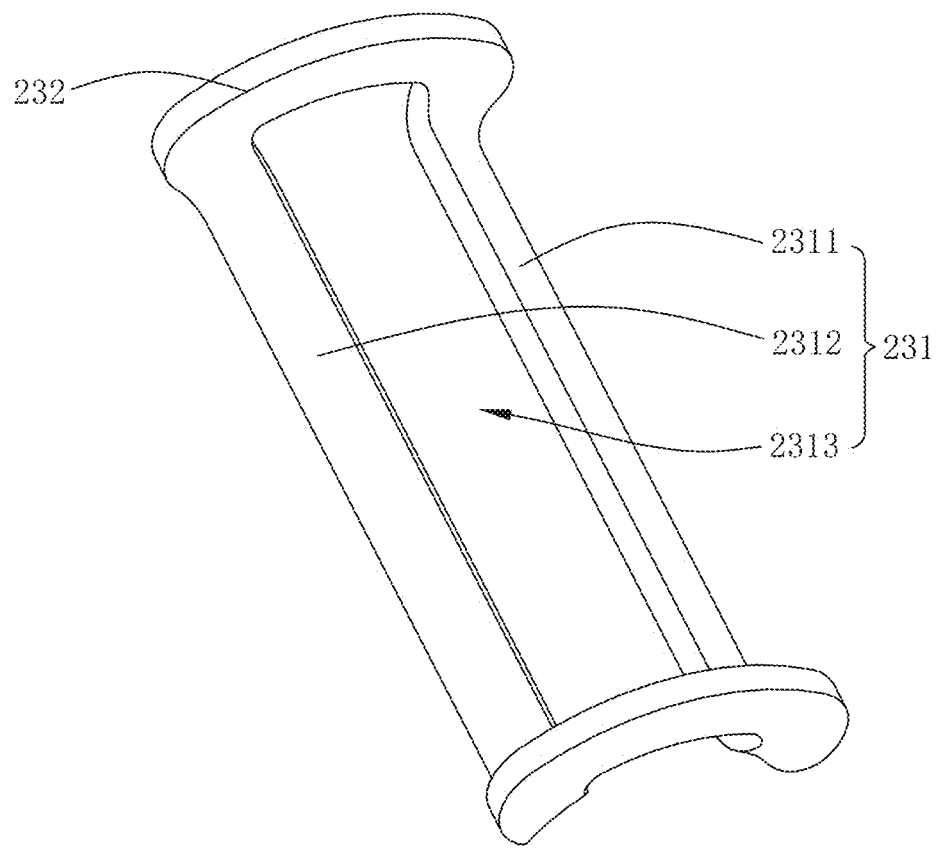
FIG. 6 is a three-dimensional structural diagram of the first coil of the coil winding shown in FIG. 4.

Referring to FIGS. 1-6, a permanent magnet synchronous motor 200 includes a rotor 1 and a stator 2 for driving the rotor 1 to rotate.

The rotor 1 includes a rotating shaft 11 and a cylindrical magnet 12 surrounding the rotating shaft 11. The magnet 12 is in a hollow cylinder shape. The magnet 12 is cylindrical, so that the magnet 12 is convenient to machine, and the rotating shaft 11 and the magnet 12 are simple in assembly.

The stator 2 includes a base 21, a core 22 received in the base 21 and surrounding the magnet 12 and coil windings 23 assembled with the core 22.

The base 21 is provided with a receiving space, a first bearing 3 and a second bearing 4 are respectively installed at two ends of the base 21, a gasket 7 is disposed between the base 21 and a bracket 5, and the base 21 is fixedly connected with the bracket 5.

The core 22 is cylindrical, and the core 22 is configured in the form of a cylinder with a smooth inner wall, that is, the core 22 is not provided with a tooth socket for embedding coils, so that the magnetic induction intensity of the air gap is completely in sinusoidal distribution, the output torque does not fluctuate, and high-precision speed and position control can be realized. The magnet 12 of the rotor 1 is sleeved in the core 22, so that the magnet 12 is installed in the core 22 conveniently, the assembly efficiency is high, and assembly automation is facilitated.

In this embodiment, there are two coil windings 23, and each coil winding 23 has three coils, which are respectively a first coil 24, a second coil 25 and a third coil 26. The first coils 24, the second coils 25 and the third coils 26 are partially superposed in sequence to form the coil windings 23 and the coil windings 23 are assembled in the core 22, specifically, the coil windings 23 are inserted into the core 22, the coil windings 23 are disposed symmetrically about the center axis of the core 22, and the first coils 24, the second coils 25 and the third coils 26 are electrically connected by a conductive part 6, so that the coil windings 23 generate a magnetic field after power-on to drive the rotor 1 to rotate.

The first coils 24, the second coils 25 and the third coils 26 have the same structure. Each of the first coils 24, the second coils 25 and the third coils 26 includes a body part 231 disposed in the core 22 and extended parts 232 respectively extended from two ends of the body part 231 in the radial direction of the core 22 and fixed on two end faces of the core 22. The extended parts 232 are arc-shaped, the two extended parts 232 of the first coil 24 are respectively fixed on the two end faces of the core 22, the extended parts 232 of the second coil 25 are partially superposed on the extended parts 232 of the first coil 24, and the extended parts 232 of the third coil 26 are partially superposed on the extended parts 232 of the second coil 25, so that the three groups of extended parts 232 are distributed in a step shape.

The body part 231 includes a first strip 2311 and a second strip 2312 parallel to each other at interval, and the first strip 2311 and the second strip 2312 form a straight slot 2313, wherein the three body parts 231 of the first coil 24, the second coil 25 and the third coil 26 are partially superposed. Specifically, the straight slot 2313 of the first coil 24 is opposite to the first strip 2311 of the second coil 25 and the first strip 2311 of the third coil 26 respectively, the straight slot 2313 of the second coil 25 is opposite to the second strip 2312 of the first coil 24 and the second strip 2312 of the third coil 26 respectively, the straight slot 2313 of the third coil 26 is opposite to the second strip 2312 of the first coil 24 and the second strip 2312 of the second coil 25 respectively, and the width of the straight slot 2313 is equal to the sum of the widths of the first strip 2311 and the second strip 2312, in order to increase the magnetic field.

The first coil 24 is shorter than the second coil 25, the second coil 25 is shorter than the third coil 26, and the two extend parts 232 of the second coil 25 are respectively sandwiched between the extend parts 232 of the first coil 24 and the extend parts 232 of the third coil 26.

The present disclosure further discloses an assembly method of the permanent magnet synchronous motor 200, including the following steps:

step S1, providing a plurality of coils, a core 22, a base 21, a first bearing 3, a second bearing 4, a rotating shaft 11, a magnet 12 and a bracket 5;

step S2, partially superposing the plurality of coils in sequence and winding the coils to form coil windings 23, wherein in this step, every three coils are wound into a coil winding 23;

step S3, inserting and assembling the coil windings 23 into the core 22, specifically, assembling the two coil windings 23 symmetrically about the center axis of the core 22, that is, installing the two coil windings 23 on two sides of the center axis respectively;

step S4, fixedly assembling the first bearing 3 on the base 21;

step S5, installing the core 22 assembled with the coil windings 23 into the base 21 to form a stator 2;

step S6, assembling the rotating shaft 11 to the magnet 12 to form a rotor 1;

step S7, inserting the rotor 1 into the core 22 of the stator 2, and connecting one end of the rotating shaft 11 with the first bearing 3 in a matching mode; and step S8, fixedly installing the second bearing 4 on the bracket 5, connecting the other end of the rotating shaft 11 with the second bearing 4 in a matching mode, and simultaneously fixing the bracket 5 on the base 21 via bolts (not shown in the figures), wherein in this step, the bracket 5 is fixed on the base 21 via four bolts.

Compared with the prior art, the permanent magnet synchronous motor provided by the present disclosure has the advantages that the core of the stator and the magnet of the rotor are of a cylindrical structure, so that the core and the magnet are convenient to machine, the assembly of the magnet and the rotating shaft and the assembly of the magnet and the core are simple and quick, and the assembly efficiency can be improved; and the plurality of coils are partially superposed in sequence to form coil windings and the coil windings are inserted into the core, so that the magnetic field generated by the coils is concentrated, and the driving force of the magnetic field is strong.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A permanent magnet synchronous motor, comprising:
a rotor, wherein the rotor comprises:
a rotating shaft, and
a cylindrical magnet surrounding the rotating shaft;
a stator, wherein the stator comprises:
a base,
a cylindrical core received in the base and surrounding the magnet, and
coil windings assembled with the core, wherein the coil windings are symmetrical about the center axis of the core, and the coil winding comprises a plurality of coils inserted into the core, each coil comprises a body part and extended parts respectively extended from two ends of the body part, a plurality of body parts are superposed and disposed in the core, a plurality of extended parts are respectively extended in the radial direction of the core and fixed on two end faces of the core, and the plurality of extended parts are partially superposed and distributed in a step shape.

2. The permanent magnet synchronous motor as described in claim 1, wherein the body part comprises a first strip and a second strip parallel to each other at interval, and a straight slot is formed between the first strip and the second strip.

3. The permanent magnet synchronous motor as described in claim 2, wherein the width of the straight slot is equal to the sum of the widths of the first strip and the second strip.

4. The permanent magnet synchronous motor as described in claim 3, wherein the quantity of coils of each coil winding is n, the straight slot of the (n−2)th coil is opposite to the first strip of the (n−1)th coil and the first strip of the nth coil respectively, the straight slot of the (n−1)th coil is opposite to the second strip of the (n−2)th coil and the second strip of the nth coil respectively, the straight slot of the nth coil is opposite to the second strip of the (n−2)th coil and the second strip of the (n−1)th coil respectively, and n≥3.

5. The permanent magnet synchronous motor as described in claim 1, wherein the lengths of the coils in each coil winding are gradually increased in the radial direction of the core from outside to inside.

6. The permanent magnet synchronous motor as described in claim 5, wherein the quantity of coils of each coil winding is n, the extended parts of the (n−2)th coil are fixed on the end face of the core, the extended parts of the (n−1)th coil are partially superposed on the extended parts of the (n−2)th coil, the extended parts of the nth coil are partially superposed on the extended parts of the (n−1)th coil, and n≥3.

7. The permanent magnet synchronous motor as described in claim 1, wherein there are two coil windings.

8. The permanent magnet synchronous motor as described in claim 1, wherein the extended parts are arc-shaped.

9. An assembly method of the permanent magnet synchronous motor as described in claim 1, comprising the following steps:
providing a plurality of coils, a core, a base, a first bearing, a second bearing, a rotating shaft, a magnet and a bracket;
partially superposing the plurality of coils in sequence and winding the coils to form coil windings;
inserting and assembling the coil windings into the core;
fixedly assembling the first bearing on the base;
installing the core assembled with the coil windings into the base to form a stator;
assembling the rotating shaft to the magnet to form a rotor;
inserting the rotor into the core of the stator, and connecting one end of the rotating shaft with the first bearing in a matching mode; and
fixedly installing the second bearing on the bracket, connecting the other end of the rotating shaft with the second bearing in a matching mode, and simultaneously fixing the bracket on the base via bolts.

* * * * *